(12) United States Patent
Hoffman

(10) Patent No.: US 6,732,279 B2
(45) Date of Patent: May 4, 2004

(54) ANTI-VIRUS PROTECTION SYSTEM AND METHOD

(75) Inventor: Terry G. Hoffman, Clearwater, FL (US)

(73) Assignee: Terry George Hoffman, Clearwater, FL (US)

( * ) Notice: Subject to any disclaimer, the term of this patent is extended or adjusted under 35 U.S.C. 154(b) by 0 days.

(21) Appl. No.: 10/346,025

(22) Filed: Jan. 16, 2003

(65) Prior Publication Data

US 2003/0131249 A1 Jul. 10, 2003

Related U.S. Application Data

(63) Continuation-in-part of application No. 09/804,796, filed on Mar. 14, 2001.

(51) Int. Cl.[7] .............................................. H04L 9/00
(52) U.S. Cl. ..................................................... 713/201
(58) Field of Search ........................... 713/201; 209/229

(56) References Cited

U.S. PATENT DOCUMENTS

| | | | | |
|---|---|---|---|---|
| 5,898,830 A | * | 4/1999 | Wesinger et al. | 713/201 |
| 5,958,051 A | * | 9/1999 | Renaud et al. | 713/200 |
| 5,978,567 A | * | 11/1999 | Rebane et al. | 709/219 |
| 5,983,350 A | * | 11/1999 | Minear et al. | 713/201 |
| 6,049,877 A | * | 4/2000 | White | 713/201 |
| 6,092,194 A | * | 7/2000 | Touboul | 713/200 |
| 6,098,172 A | * | 8/2000 | Coss et al. | 713/201 |
| 6,105,027 A | * | 8/2000 | Schneider et al. | 707/9 |
| 6,158,011 A | * | 12/2000 | Chen et al. | 713/201 |
| 6,480,963 B1 | * | 11/2002 | Tachibana et al. | 713/201 |
| 2002/0069356 A1 | * | 6/2002 | Kim | 713/160 |

OTHER PUBLICATIONS

John Williamson. , "Safe at Last?", Global Telephony. Overland Park: Apr. 2001. vol. 9, Iss. 4; p. 35 (5 pages).*
Mendes, Gerald H. , "Next Generation IP takes shape", Business Communications Review. Hinsdale: Mar. 1996. vol. 26, Iss. 3; p. 49 (5 pages).*

* cited by examiner

Primary Examiner—Kim Vu
Assistant Examiner—Ronald Baum
(74) Attorney, Agent, or Firm—Terry George Hoffman

(57) ABSTRACT

An anti-virus protection system and method for use within a data transmission network to protect against the transfer of viruses from a transmission originator having a discrete transmission originator code to a subscriber/recipient having a discrete subscriber/recipient IP address code over the data transmission network comprising the steps of assigning a discrete security code to the transmission originator, generating a transmission pack including a discrete subscriber/recipient IP address code element corresponding to the discrete subscriber/recipient IP address code of the subscriber/recipient, a discrete security code element corresponding to the discrete security code assigned to the transmission originator, a file extension element and a data packet element; transmitting the transmission pack to a data transfer control; authenticating the transmission pack with the discrete subscriber/recipient IP address code element, discrete security code element and discrete transmission originator code; transferring the authenticated transmission pack to the subscriber/recipient and isolating the subscriber/recipient from an unauthenticated transmission pack received by the data transfer control from a transmission originator to prevent the transfer of an unauthenticated transmission pack to the subscriber/recipient.

12 Claims, 4 Drawing Sheets

ANTI-VIRUS PROTECTION SYSTEM AND METHOD

CROSS REFERENCE TO RELATED APPLICATIONS

This is a continuation-in-part application of pending application Ser. No. 09/804,796 filed Mar. 14, 2001.

BACKGROUND OF THE INVENTION

1. Field of the Invention

An anti-virus protection system for use within a data transmission network to protect against the transfer of viruses from a source(s) or originator(s) to a recipient(s) or subscriber(s) over the data transmission network.

2. Description of the Prior Art

With the advent of data transfer over communication networks, computer viruses, worms and Trojan horses have plagued and compromised the operation of the various computers or nodes. A computer virus is a section of code that is buried or hidden in another program attaching itself to other programs in the system that, in turn, can be copied over to other programs. Such viruses can cause a message to be displayed on the screen or actually destroy programs and data. Worms, on the other hand, are destructive programs that replicate themselves using up computer resources eventually causing the computer system to crash.

The prior art has attempted to reduce the effects of viruses and eliminate the proliferation through virus detection programs. For example, an operator can monitor a computer or system for such basis operating functions such as write, erase or format disk. When such operations occur, the user is prompted to confirm whether the operation is expected. If the particular operation or function is not expected, the user aborts the operation as prompted by a virus program. Another virus detection method, scans program code being copied onto the system searching for recognizable patterns of program code used for viruses. Another method employs check summary on host programs known to be free from viruses. If a virus later attaches itself to a host program, the value will be different and the presence of a virus detected.

Unfortunately, despite these efforts of the prior art suffer from various deficiencies. Therefore, there is a need for a system and method for effectively detecting and eliminating viruses without significantly affecting the performance of the computer. Behavior interception is not successful at detecting all viruses since a virus can be placed at locations where such critical operations are likely to occur for the normal operation of programs. Second, most signature scanning is only performed on new inputs from disk drives. With the advent of the Internet and its increased popularity, there are no prior art methods that have been able to successfully scan connections such as those utilized by a gateway node in communicating with other networks. Third, many of the above methods require a significant amount of computing resources, which in turn degrades the overall performance of system. Thus, operating the virus detection programs on every computer becomes impractical. Therefore, the operation of many such virus detection programs is disabled for improved performance of individual machines.

U.S. Pat. No. 5,623,600 discloses a system for detecting and eliminating viruses on a computer network includes a File Transfer Protocol (FTP) proxy server, for controlling the transfer of files and a Simple Mail Transfer Protocol (SMTP) proxy server for controlling the transfer of mail messages through the system. The FTP proxy server and SMTP proxy server run concurrently with the normal operation of the system and operate in a manner such that viruses transmitted to or from the network in files and messages are detected before transfer into or from the system. The FTP proxy server and SMTP proxy server scan all incoming and outgoing files and messages respectively before transfer for viruses and then transfer the files and messages, only if they do not contain any viruses. The method for processing a file before transmission into or from the network includes the steps of receiving the data transfer command and file name; transferring the file to a system node; performing virus detection on the file; determining whether the file contains any viruses; transferring the file from the system to a recipient node if the file does not contain a virus; and deleting the file if the file contains a virus.

U.S. Pat. No. 6,157,721 and U.S. Pat. No. 6,292,569 describes a system and method using cryptography to protect Secure computation environments from bogus or rogue load modules, executables and other data elements through use of digital signatures, seals and certificates issued by a verifying authority. The verifying authority tests the load modules or other executables to verify that the corresponding specifications are accurate and complete, and then digitally signs the load module or other executable based on tamper resistance work factor classification. Secure computation environments with different tamper resistance work factors use different verification digital signature authentication techniques allowing one tamper resistance work factor environment to protect against load modules from another, different tamper resistance work factor environment. Several dissimilar digital signature algorithms may be used to reduce vulnerability from algorithm compromise, and subsets of multiple digital signatures may be used to reduce the scope of any specific compromise.

U.S. Pat. No. 5,416,842 teaches a first data processing device (node I) coupled to a first private network and to a firewall server (FWA). Firewall server FWA is in turn coupled to a public network such as the Internet. A second data processing device (node J) is coupled to a second private network that is coupled to the Internet through a firewall server (FWB). Node I provides a data packet including IP data and a destination address for the intended receiving node J to the firewall FWA. The firewall FWA is provided with a secret value a, and a public value. The firewall FWB is provided with a secret value and a public value. The firewall FWA obtains a Diffie-Hellman (DH) certificate for the firewall FWB and determines the public value from the DH certificate. Firewall FWA then computes the value and derives a key K. from the value .varies.sup.ab mod p. A transient key K. is randomly generated and is used to encrypt the data packet to be transmitted by firewall FWA to firewall FWB. The encrypted data packet is then encapsulated in a transmission packet by the firewall FWA. The transmission packet includes an unencrypted destination address for the firewall FWB. Firewall FWA then sends the transmission packet to firewall FWB over the Internet. Upon receipt of the transmission packet from firewall FWA, firewall FWB obtains a DH certificate for firewall FWA, and determines the public value of from the DH certificate. Firewall FWB computes the value of .varies.sup.ab mod p, and derives the key K.sub.ab. Firewall B utilizes the key K.sub.ab to decrypt the transient key K. and using the decrypted transient key K. firewall FWB decrypts the encrypted data packet received from FWA, thereby resulting in the recovery of the original data sent by node I in unencrypted form to the firewall FWA. The firewall FWB then transmits the decrypted data packet to the receiving node J over the second private network.

U.S. Pat. No. 5,432,850 shows a method for secure transmission of data having a destination address and a source address on a shared communication network. The method comprise the steps of transmitting a multiplicity of data frames, each containing at least an encrypted data sequence employing the destination address as at least part of a decryption key therefor, receiving the multiplicity of data frames at a receiver on the shared communication network and attempting to decrypt the encrypted data sequence by employing the local address of the receiver as at least part of a decryption key.

U.S. Pat. No. 5,511,122 relates to an internet authentication method to verify a sending host by a receiving host or an intermediate router or gateway. The method comprises the steps of: obtaining a network address and a public key of a receiving host; utilizing the public key from the receiving host in combination with a private key of the originating host to generate a cryptographic signature; transmitting the signature along with data through a first subnetwork in at least one packet; receiving at least one packet at the receiving host; and the receiving host utilizing a private key of said receiving host site and a public key of said originating host to verify said cryptographic signature.

U.S. Pat. No. 6,065,118 shows a system to reduce the risk of damage to data or programs in an end user computer system programmed to operate in response to an imported data stream containing one or more mobile program components from an external source. The incoming data stream is screened to identify mobile program components of that data stream. Some of the mobile program components are passed to a program execution location isolated from the end user system prior to being executed to operate in a desired manner. The execution location has an interface with the external source of the data stream and an interface with the end user system. The operation of the interface between the execution location and the end user system is programmed so that only data that has been interacted on by the program component within the execution location in a specified and controlled manner can be passed to and from the end user system.

U.S. Pat. No. 6,067,620 describes a secure network interface unit (SNIU) to provide multi-level security on a network having a plurality of secured and unsecured users including network interface means for communicating on the network, identifying the source and destination of a message intercepted on the network; determining the security levels of each of the plurality of users; a trusted computing base for determining whether the message, if transmitted to the destination user, will violate security parameters; and, cryptographically encrypting messages sent to, and decrypting messages received from another SNIU affiliated with the destination user.

U.S. Pat. No. 6,108,583 shows a system and method for data communication with adaptive security in which a send host transmits a data stream to a receive host in packets which contain an authentication data block with an authentication header and a signature block. The authentication header advantageously contains various fields including a verification type, a security algorithm, a minimum security level, a target security level, and an actual security level. The receive host adaptively performs verification of the data packets using varying security levels based in part on the availability of security operations per second (SOPS) in the receive host. Where a data stream in the receive host is delayed by a security processing bottleneck, the receive host may alter the verification type, security algorithm, or the actual security level to speed up the processing of the data stream by reducing the amount of security processing performed. The receive host further allocates the SOPS among the data streams received.

U.S. Pat. No. 6,229,806 describes a communication system in which a user device generates authentication information unique to the user device and provides a data packet including this authentication information to an infrastructure part which is a gateway or a host. The packet also contains a host identifier or time dependent information. This is used at the gateway or the host to authenticate the packet.

2002/0023214 shows how secure computation environments are protected from bogus or rogue load modules, executables and other data elements through use of digital signatures, seals and certificates issued by a verifying authority. A verifying authority tests the load modules or other executables to verify that their corresponding specifications are accurate and complete, and then digitally signs the load module or other executable based on tamper resistance work factor classification. Secure computation environments with different tamper resistance work factors use different verification digital signature authentication techniques, e.g. different signature algorithms and/or signature verification keys, allowing one tamper resistance work factor environment to protect itself against load modules from another, different tamper resistance work factor environment. Several dissimilar digital signature algorithms may be used to reduce vulnerability from algorithm compromise, and subsets of multiple digital signatures may be used to reduce the scope of any specific compromise.

2002/0040439 teaches a system and method for providing external data signal isolation, and signal-level information-preserving-data-transformations, to enable safe, operationally efficient, information sharing between protected information systems and networks and external, potentially hostile, information systems and networks which neutralizes any imbedded hostile executable codes such as viruses that may be in data-signals incoming from the external systems and networks. The system and method prevent untransformed external data-signals from entering protected systems and/or networks using an intermediate screen that is a computer hardware device. The intermediate screen, which may be implemented as a network of systems, is deployed between the protected systems and external systems and is used to process all incoming signals from the external system to obtain transformed data sets from which information is extracted before it is passed to the protected system. The incoming signals all remain confined in the intermediate screen.

SUMMARY OF THE INVENTION

The present invention relates to an anti-virus protection system and method for use with a data transmission network to protect against the transfer of viruses or other unwanted data. The data transmission network comprises a network of transmission originators and subscribers/recipients coupled through a data transfer control means or router.

The data transfer control means functions as a gate keeper to detect viruses, worms, Trojan horses or spam before handing-off any data to a subscriber/recipient acting as a virtual isolation room to isolate subscribers/recipients from unwanted transmissions.

The anti-virus protection method is implemented through the use of a transmission pack formatted to allow the data transmission control means to scan the transmission pack for preassigned security codes, subscriber/recipient information and other authentication information to control the transfer of data between transmission originators and subscribers/recipients.

The method comprises the steps of assigning a discrete security code to the transmission originator; generating a transmission pack including a discrete subscriber/recipient IP address code element corresponding to the discrete subscriber/recipient IP address code of the subscriber/recipient, a discrete security code element corresponding to the discrete security code assigned to the transmission originator, a file extension element and a data packet element; transmitting the transmission pack to the data transfer control means; authenticating the transmission pack with the discrete subscriber/recipient IP address code element, discrete security code element and transmission originator; transferring the authenticated transmission pack to the subscriber/recipient and isolating the subscriber/recipient from an unauthenticated transmission pack to prevent the transfer of an unauthenticated transmission pack to the subscriber/recipient.

The invention accordingly comprises the features of construction, combination of elements, and arrangement of parts which will be exemplified in the construction hereinafter set forth, and the scope of the invention will be indicated in the claims.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
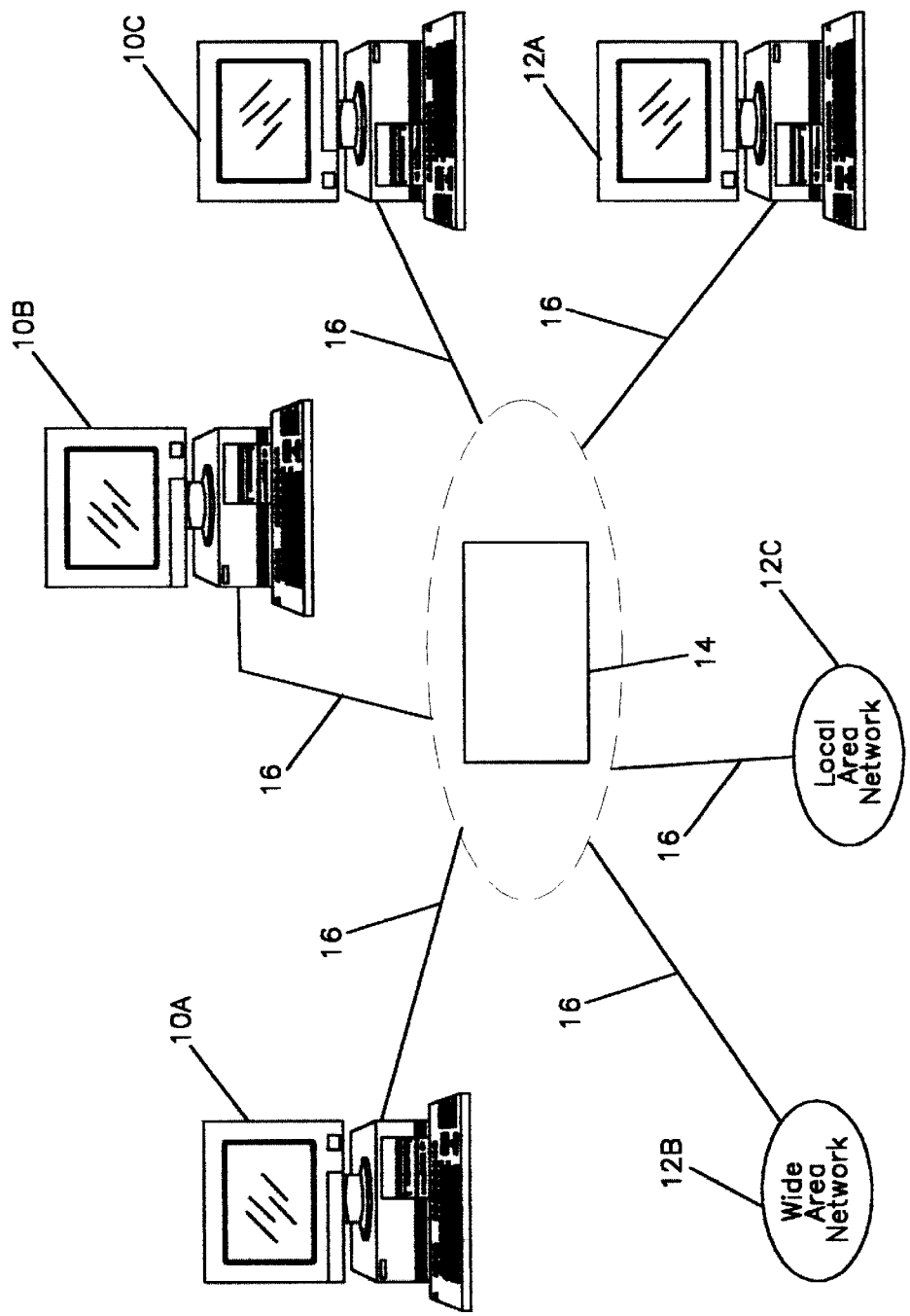
FIG. 1 depicts a data communication network in which the anti-virus protection system of the present invention is deployed.

The present invention relates to an anti-virus protection system and method for use with a data transmission network to protect against the transfer of viruses or other unwanted data. As shown in FIG. 1, the data transmission network comprises at least one transmission originator 10 coupled to at least one subscriber/recipient 12 by a data transfer control means or router 14 and a plurality of communication links each indicated as 16. The subscribers/recipients 12 may compromise a personal computer 12A, a wide area network 12B or a local area network 12C.

Since the data transfer control means 14 includes circuitry and logic to scan transmissions from the transmission originator 10 as a gate keeper to detect viruses, worms, Trojan horses or spam before handing-off any data to a subscriber/recipient 12, the data transfer control means 14, in effect, acts as a virtual isolation room to isolate subscribers/recipients 12 from unwanted transmissions.

The anti-virus protection method is implemented through the use of a transmission pack formatted to allow the data transmission control means to scan the transmission pack for preassigned security codes, subscriber/recipient information and other authentication information to control the transfer of data between transmission originators and subscriber/recipients.

Figure 4:
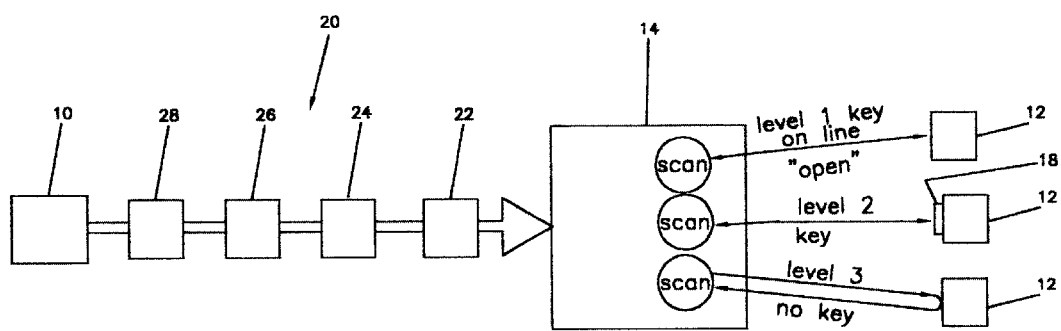
FIG. 4 diagramically depicts the system of the anti-virus protection system of the present invention.

An extended security or key code as described hereinafter is selected and assigned to each transmission originator 10. As shown in FIG. 1, the system includes a plurality of security levels. For example, a transmission originator 10A that transmits particularly significant or sensitive information such as a bank of other financial institution that transmits through an 'on-line' basis, having been assigned a 'secure degree' encrypted address or key. Less sensivite information that might be subject to E-mails between a subscriber/recipient 12A/12B/12C and a transmission originator 10B can be accessed or transferred with the second level of security. At this level, the transmission is screened for known viruses and/or trigger references and, if clean, then routed to a holding mailbox or mini-server 18 (FIG. 4). Transmissions not having an assigned security code are classified as 'non-extension' transmissions, either for selective subsequent 'discrete' review by a subscriber/recipient 12A/12B/12C or rejected and automatically returned to the transmission originator 10C.

Of course, a transmission originator 10 can be assigned multiple security codes corresponding to each of the plurality of security levels to allow the system to authenticate and transfer data of different levels of security from a single transmission originator 10 to one or more subscribers/recipients 12A/12B/12C.

Figure 3:
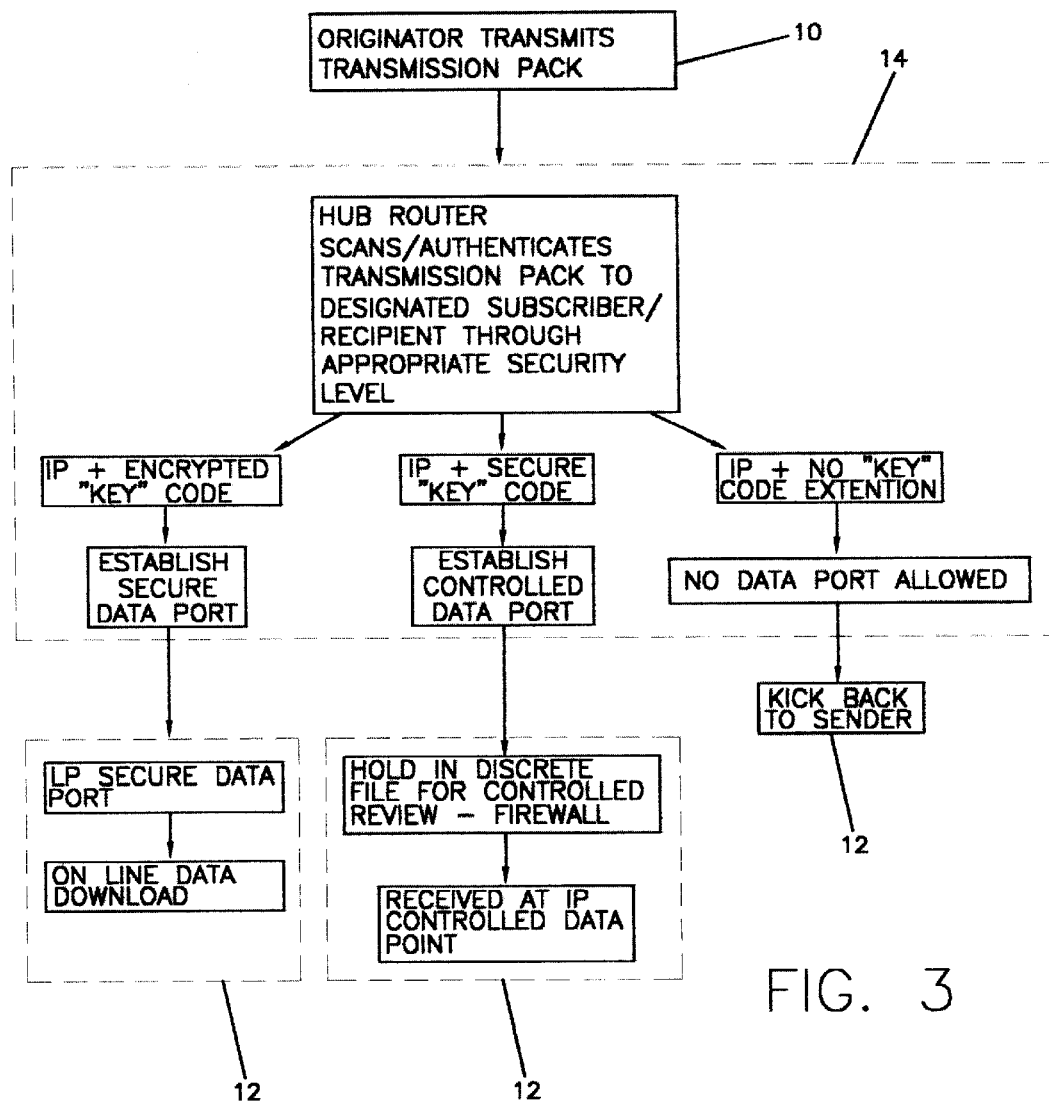
FIG. 3 is a flow chart depicting the sequence of operation of the method of the anti-virus protection system of the present invention.

As shown in FIGS. 1, 3 and 4, the data transmission control means or router 14 is operatively 'in-line' between transmission originators 10A/10/B/10C and the subscribers/recipients 12A/12B/12C. For example, in the larger wide area network systems 12B, the data transmission control means or hub router 14 can be either at the internet service provider hub router or NAP distribution point that precedes the final transmittal address or can be internal to the termination point receiver/router. In smaller systems such as the local area network 12C or individual PC 12A, the data transmission control means or hub router 14 can be located at the terminal point, either as part of the PC or at the Intranet terminal receiver/router.

As previously described, the anti-virus protector method is implemented through the use of a transmission pack formatted to allow the data transmission control means or router 14 to scan the transmission pack for preassigned security codes, subscriber/recipient information and other authentication information and to transfer data from transmission originators 10A/10B/10C to subscribers/recipients 12A/12B/12C when a transmission pack is authenticated as having the appropriate coded information.

Figure 2:
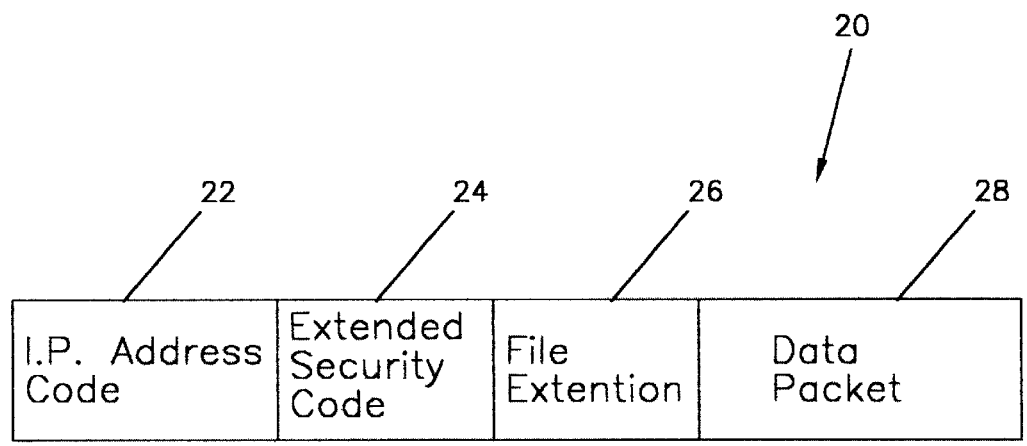
FIG. 2 depicts a transmission pack of the anti-virus protection system of the present invention.

As shown in FIG. 2, the transmission pack generally indicated as 20 comprises an IP address code element 22 that identifies the postal box of an addressee or recipient, an extended security or key code element 24 to designate one of the plurality of corresponding security levels previously described, a file extension element 26 to indicate the program language and a data packet element 28 comprising the data to be transmitted or transferred.

The method of the present invention is to protect against the transfer of viruses from a transmission originator 10 having a discrete transmission originator code to a subscriber/recipient 12 having a discrete subscriber/ recipient IP address code over the data transmission network comprising the steps of assigning a discrete security code to the transmission originator 10; generating a transmission pack 20 including the discrete subscriber/recipient IP address code element 22 corresponding to the discrete subscriber/recipient IP address code of the subscriber/recipient 12, a discrete security code element 24 corresponding to the discrete security code assigned to the transmission originator 10, a file extension element 26 and a data packet element 28; transmitting the transmission pack 20 to a data transfer control means 14; authenticating the transmission pack 20 with the discrete subscriber/recipient IP address code element 22, discrete security code element 24 and discrete transmission originator code; transferring the authenticated transmission pack 20 to the subscriber/recipient 12 and isolating the subscriber/recipient 12 from an unauthenticated transmission pack to prevent the transfer of an unauthenticated transmission packet scanned and compared with the authenticating information by the data transfer control means 14 to the subscriber/recipient 12.

The discrete security codes and corresponding discrete security code elements 24 may represent one of a plurality of predetermined security levels where a single transmission originator 10 can be preassigned multiple level security codes corresponding to more than one of the levels of security for data as varying sensitivity or security dictates.

In addition, the discrete security code elements 24 can include the identity of the transmission originator 10 assigned the specific discrete security code and corresponding discrete security code element.

As previously mentioned, a discrete extended security or key code element 22 is selected and assigned to each transmission originator 10A/10B/10C to correspond to one of the three levels of security. In addition, a transmission originator 10 may be assigned several different discrete security code elements to transmit and transfer data to subscribers/recipients having different security requirements.

Specifically as depicted in FIG. 3, the data transfer control means or hub router 14 scans transmission packs 20 addressed to a subscriber/recipient 12A/12B/12C through appropriate security level.

If the IP address code element 22, encrypted "key" code or discrete security code element 24 (first security level) and transmission originator 10 are authenticated by comparison with the authentic transmission pack format, the system establishes a secure data port to transfer or download the data to the subscribers/recipients 12.

If the IP address code element 22, secure "key" code or discrete security code element 24 (second security level) and transmission originator 10 are authenticated, the system establishes a controlled data port received at IP controlled data point and routed to a holding mail box or mini-server 18 at the subscriber/recipient 12 for selective review before downloading by the subscriber/recipient 12.

If the IP address code element 22 and no "key" code extention 24 (third level of security) are not authenticated, no data port is opened or established and data is returned to the transmission originator 10.

It will thus be seen that the objects set forth above, among those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An anti-virus protection method for use within a data transmission network to protect against the transmission of unwanted data from a transmission originator having a plurality of assigned security codes corresponding to a plurality of data security levels to a subscriber/recipient having a plurality of assigned discrete subscriber/recipient IP address codes over the data transmission network including a data transfer control means and a plurality of data transmission ports corresponding to the plurality of security levels, wherein said plurality of assigned security codes includes a first data security level code element and a second data security level code element and said plurality of data transmission ports include a first data transmission port and a second data transmission port such that data are transmitted through the first data transmission port to the subscriber/recipient when said discrete security code element is authenticated as a first data security code level element and data are transmitted through the second data transmission port to the subscriber/recipient when said discrete security code element is authenticated as a second data security level code element, whereas the anti-virus protection method comprising the steps of: generating a transmission pack including a discrete security code element corresponding to the data security level selected by the transmission originator of the data to be transmitted and a discrete subscriber/recipient IP address code element corresponding to the discrete subscriber/recipient IP address code of the subscriber/recipient, transmitting data and said transmission pack to the data transfer control means that includes circuitry and logic to scan said transmission packets from the transmission originator for discrete security code elements and discrete subscriber/recipient IP address code elements to control the transfer of data from transmission originators to subscriber/recipients through said data transfer control means; scanning said transmission pack to authenticate discrete subscriber/recipient IP address code elements and discrete security code elements; transferring data in authenticated transmission packs to the subscriber/recipient through the data transmission port corresponding to the data security level.

2. The anti-virus protection method of claim 1 wherein said plurality of assigned security codes further includes a third data security level code element such that data are transmitted through a third data transmission port to the subscriber/recipient when said discrete security code element is authenticated as a third security level code element.

3. The anti-virus protection method of claim 1 wherein said plurality of assigned security codes further includes a third data security level code element such that transmitted data is isolated from the subscriber/recipient when an unauthenticated transmission pack is sent to prevent the transfer of the transmission pack to the subscriber/recipient.

4. The anti-virus protection method of claim 1 wherein said first data transmission port comprises a secure data port to transfer the data to the subscriber/recipient and said second data transmission port comprises a controlled data port wherein authenticated data are held for selective review by the subscriber/recipient before downloading by the subscriber/recipient.

5. The anti-virus protection method of claim 4 wherein said plurality of assigned security codes further includes a third data security level code element such that data are transmitted through a third data transmission port to the subscriber/recipient when said discrete security code element is authenticated as a third security level code element.

6. The anti-virus protection method of claim 4 wherein said plurality of assigned security codes further includes a third data security level code element such that transmitted data is isolated from the subscriber/recipient when an unauthenticated transmission pack is sent to prevent the transfer of the transmission pack to the subscriber/recipient.

7. An anti-virus protection method for use within a data transmission network to protect against the transmission of unwanted data from a transmission originator having a plurality of assigned security codes corresponding to a plurality of data security levels to a subscriber/recipient having an assigned discrete subscriber/recipient IP address code over the data transmission network including a data transfer control means and a plurality of data transmission ports corresponding to the plurality of security levels, wherein said plurality of assigned security codes includes a first data security level code element and a second data security level code element and said plurality of data transmission ports include a first data transmission port and a second data transmission port such that data are transmitted through the first data transmission port to the subscriber/recipient when said discrete security code element is authenticated as a first data security code level element and data are transmitted through the second data transmission port to the subscriber/recipient when said discrete security code element is authenticated as a second data security level code element, whereas the anti-virus protection method comprising the steps of: generating a transmission pack including a discrete security code element corresponding to the data security level selected by the transmission originator of the data to be transmitted and a discrete subscriber/recipient IP address code element corresponding to the discrete subscriber/recipient IP address code of the subscriber/recipient, a file extension element and a data packet element; transmitting data and said transmission pack to the data transfer control means that includes circuitry and logic to scan the transmission packets from the transmission originator for discrete security code elements and discrete subscriber/recipient IP address code elements to control the transfer of data from transmission originators to subscriber/recipients through the data transfer control means; scanning said transmission pack for discrete subscriber/recipient IP address code elements and discrete security code elements; transferring data from authenticated transmission packs to the subscriber/recipient through the data transmission port corresponding to the data security level.

8. The anti-virus protection method of claim 7 wherein said plurality of assigned security codes further includes a third data security level code element such that data are transmitted through a third data transmission port to the subscriber/recipient when said discrete security code element is authenticated as a third security level code element.

9. The anti-virus protection method of claim 7 wherein said plurality of assigned security codes further includes a third data security level code element such that data is isolated from the subscriber/recipient when an unauthenticated transmission pack to prevent the transfer of to the subscriber/recipient.

10. The anti-virus protection method of claim 7 wherein said first data transmission port comprises a secure data port to transfer the data to the subscriber/recipient and said second data transmission port comprises a controlled data port wherein authenticated data are held for selective review by the subscriber/recipient before downloading by the subscriber/recipient.

11. The anti-virus protection method of claim 10 wherein said plurality of assigned security codes further includes a third data security level code element such that data are transmitted through a third data transmission port to the subscriber/recipient when said discrete security code element is authenticated as a third security level code element.

12. The anti-virus protection method of claim 10 wherein said plurality of assigned security codes further includes a third data security level code element such that transmitted data is isolated from the subscriber/recipient when an unauthenticated transmission pack is sent to prevent the transfer of the transmission pack to the subscriber/recipient.

* * * * *